UNITED STATES PATENT OFFICE.

CHARLES HERBERT ROBINSON, OF PHILADELPHIA, PENNSYLVANIA, ASSIGNOR TO HIMSELF AND GEORGE T. LEWIS, OF SAME PLACE.

PROCESS OF THICKENING LINSEED-OIL.

SPECIFICATION forming part of Letters Patent No. 414,722, dated November 12, 1889.

Application filed January 16, 1889. Serial No. 296,558. (No specimens.)

*To all whom it may concern:*

Be it known that I, CHARLES HERBERT ROBINSON, of the city and county of Philadelphia, State of Pennsylvania, have invented a new and useful Method of Thickening Linseed-Oil, of which the following is a true and exact description.

My invention relates to the treatment of linseed-oil in order to thicken it for subsequent uses—such as the manufacture of linoleum and lithographic varnishes. Heretofore this thickening of the oil has been accomplished in different ways, according to the degree of thickening or oxidation required, all, however, requiring protracted heating of the oil and elaborate manipulation.

To prepare the oil for use in the manufacture of linoleum, it is boiled with litharge and subsequently exposed in thin films to the action of the atmosphere, under which treatment it absorbs a large quantity of oxygen and becomes a thick gummy mass. I mention this, as the oxidized oil thus prepared is a valuable and preferred reagent in my new method.

I have discovered that by mixing with raw linseed-oil a portion of previously-oxidized oil the raw oil will absorb a portion of the oxygen from the oxidized oil and rapidly thicken to a degree depending on the conditions under which the method is pursued. My preferred treatment is as follows: I take a quantity of the highly-oxidized oil prepared by the treatment with litharge and subsequent exposure to the atmosphere, and, having heated a quantity of raw oil to a high temperature, I add from two to ten per cent. of the oxidized oil to it and maintain the mixture at a high temperature with exposure to the air until it has reached the desired degree of thickness, which will, in general, be in from a half hour to an hour and a half.

In preparing oil for the manufacture of linoleum I have attained excellent results by heating the raw oil to a temperature at which it will be about ready to ignite if a flame is brought near its surface, say 630° to 640° Fahrenheit, and then adding to it about five per cent. of the highly-oxidized oil above referred to. I then maintain the mixture at the same high temperature until it thickens by absorption of oxygen from the oxidized oil and from the atmosphere, the length of time depending on the bulk of oil treated and the means taken to expose it to the action of the air. This exposure can be facilitated by blowing air through the oil by rapid stirring or by allowing the hot oil to pass in thin streams or sheets through air.

In the manufacture of lithographic varnishes I heat the oil to about the same degree, but after adding the oxidized oil do not maintain the high heat of the mixture for so long a time, but allow it to cool when it has attained proper thickness for the use intended. Where the thickening of the oil required is but little, as in giving to raw oil the qualities of older and purified oil, it is not necessary to heat the oil to so high a temperature, and I have attained good practical results of this kind at a temperature of from 250° to 300° Fahrenheit. It is indeed evident that the oxidizing action of the oxidized oil used as a reagent goes on with greater or less efficiency at substantially all temperatures.

To obtain the best results in thickening oil, the reagent should be oxidized to the highest possible degree; but less highly oxidized oil can be used with advantage in the thickening of oil to give it the qualities usually recognized as those of age. Where the thickened oil is to be employed for some purpose where its rapid drying is desirable, this can be facilitated by placing in the kettle in which it is heated a small quantity of litharge, say about one per cent. The litharge should not be added to the oil before it (the oil) has reached a temperature of about 350° to 400° Fahrenheit.

Having now described my invention, what I claim as new, and desire to secure by Letters Patent, is—

1. The method of thickening linseed-oil which consists in adding to said oil a portion of previously-oxidized linseed-oil in a solid state.

2. The method of thickening linseed-oil which consists in heating said oil and adding to it a portion of previously oxidized and solidified linseed-oil.

3. The method of thickening linseed-oil which consists in heating said oil, adding to it a portion of previously oxidized and solidified linseed-oil, and maintaining the mixture at a high heat.

4. The method of thickening linseed-oil which consists in heating said oil, adding to it a portion of previously-oxidized linseed-oil, maintaining the mixture at a high heat, and subjecting the hot mixture to the action of air.

5. The method of thickening linseed-oil which consists in heating said oil and adding to it a portion of linseed-oil previously oxidized and solidified by treatment with litharge and subsequent exposure to the atmosphere.

6. The method of thickening linseed-oil which consists in heating said oil, adding to it a portion of linseed-oil previously oxidized by treatment with litharge and subsequent exposure to the atmosphere, and exposing the hot mixture to the action of air.

7. The method of thickening linseed-oil which consists in heating linseed-oil to a temperature at or near that at which its surface will ignite on exposure to flame, adding to the heated oil previously-oxidized linseed-oil, and maintaining the mixture at the said high temperature with exposure to the air until the desired thickness is obtained.

8. The method of thickening linseed-oil which consists in heating linseed-oil to a temperature at or near that at which its surface will ignite on exposure to flame, adding to the oil after it has attained a temperature of over 350° a small quantity of litharge, and adding to the heated oil when it has reached the temperature first aforesaid previously-oxidized linseed-oil, and maintaining the mixture at the said high temperature with exposure to the air until the desired thickness is obtained.

CHARLES HERBERT ROBINSON.

Witnesses:
LEWIS R. DICK,
FRANCIS T. CHAMBERS.